March 28, 1939. A. J. KRAMER 2,152,317
WIND TUNNEL AND METHOD FOR DETERMINING STREAMLINE CONTOURS
Filed July 27, 1937
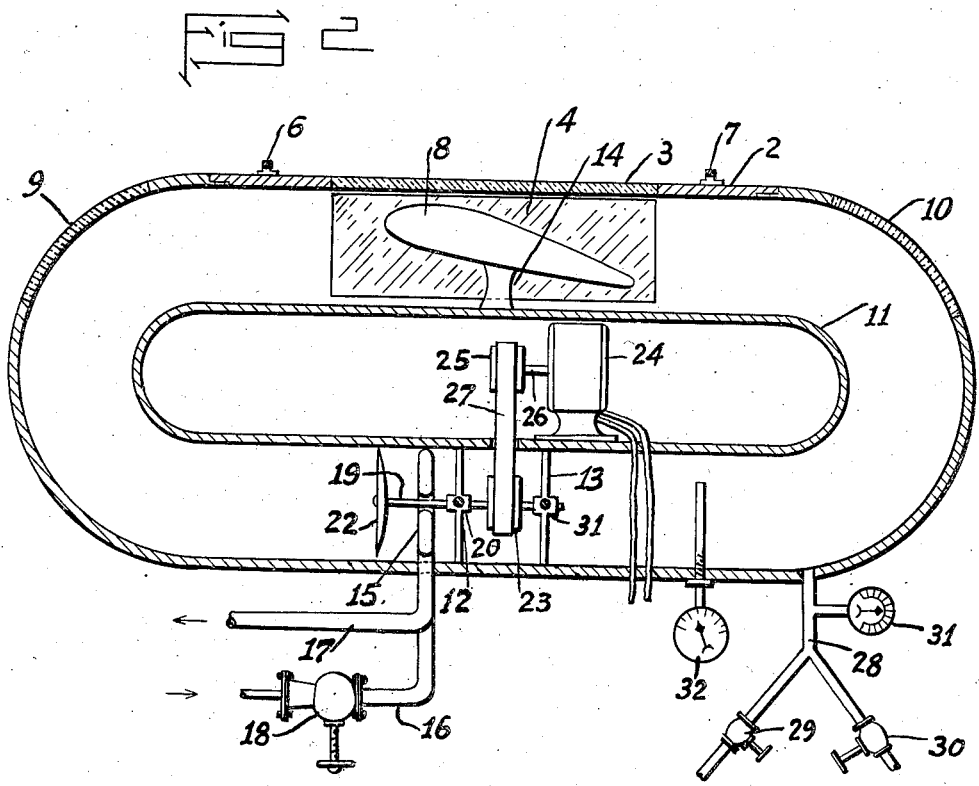
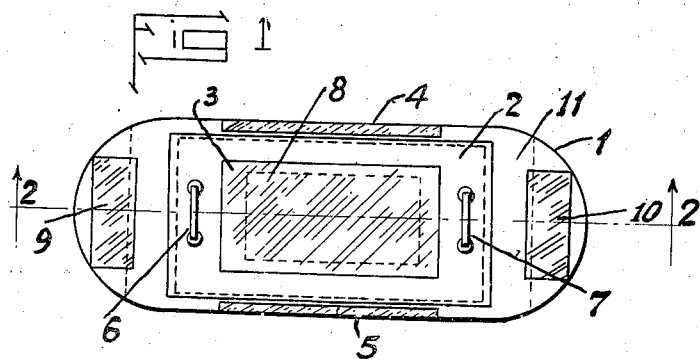
Inventor
Albert J. Kramer Patented Mar. 28, 1939

2,152,317

UNITED STATES PATENT OFFICE 2,152,317

WIND TUNNEL AND METHOD FOR DETERMINING STREAMLINE CONTOURS

Albert J. Kramer, Washington, D. C.

Application July 27, 1937, Serial No. 155,982

6 Claims. (Cl. 73—51)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

This invention relates to wind tunnels and a method for determining streamline contours, and is more particularly concerned with the streamlining of models, including all parts of airplanes, automobiles, ships, boats, trains, etc.

An object of this invention is to provide a model made of ice, or other material disposable by heat, in a flow stream of air or other suitable medium, said medium being conditioned such that the heat produced by eddy currents formed about any part of model will cause that part to dissolve, thereby leaving a streamlined contour.

Heretofore, in the experimentation of streamlining it was necessary to construct many models, and test each one separately in order to determine the best streamline contour. Such a procedure of trial and error is not only tedious but obviously imperfect as well. Using this invention it is only necessary to construct one model of the approximate shape of the object to be streamlined, and by regulating the temperature in conjunction with the pressure and/or velocity, the perfect streamline contour can be obtained for any desired conditions.

The following specification taken together with the accompanying drawing will fully disclose this invention and further objects, and advantages thereof, will be apparent.

In the drawing:

Figure 1 is a plan view of this invention in its preferred form.

Figure 2 is an enlarged cross-sectional view of Figure 1 on the line 2—2.

Referring with more particularity to Figure 1, the numeral 1 designates a tank having a proportion adapted to the size of the model to be tested, and preferably of a heat insulating material. A close-fitting door 2, on top of said tank is provided with means for resisting opening against pressure inside the tank. A window 3, of glass, or other similar transparent material, is mounted in the door 2. Panes of glass, or other similar material, designated by the numerals 4, 5, 9, and 10, are also provided as shown in the drawing, but it is to be understood that although only five windows are shown, other windows may be provided to the limit of making the whole tank structure of a transparent material. Panels 6 and 7 are attached to said door to facilitate placing and removing it. A model 8, of water ice, snow, carbon dioxide, iodine, napthalene, or other suitable material disposable by heat or eddy currents, is shown in the drawing mounted below the window 3 and between the windows 4 and 5, and 9 and 10.

Referring with more particularity to Figure 2, the numeral 11 designates an inner portion of the said tank in spaced relation to the outer shell 1, thereby establishing an endless tunnel within the tank through which the flow medium circulates. The part 11 is shown supported by stanchions 12 and 13, but any number of stanchions may be used as well as any other suitable means.

The model 8 is molded, sculptured, or otherwise constructed, and is mounted on the member 11 by means of the support 14. The means of support may vary with the kind of model used.

Expansion coils 15 are positioned in the path of the flow medium, and a refrigerant circulates therethrough. Said expansion coils are provided with an inlet 16 and an outlet 17. An expansion valve 18 is provided on the inlet 16 for the purpose of producing and controlling the desired temperature in the coils 15. It is to be understood that any type of temperature control may be employed for this purpose, and that if it should be necessary to utilize a heat-producing system in lieu of a refrigerating system of temperature control such a change is within the scope and spirit of this invention. The means shown in the drawing are merely suggestive.

A shaft 19 is mounted on bearings 20 and 21 of the stanchions 12 and 13, respectively. A propellor 22 is mounted on one end of the shaft 19 as shown in the drawing. It is desirable to have the propeller mounted so that with respect to the coils 15 and the supporting stanchions 12 and 13, as well as other parts shown in the flow medium in the lower part of the said tank, there is no obstruction between the propeller and the model 8. This is for excluding as many eddy currents from the flow medium as possible before it passes around to the model.

A pulley 23 is mounted on the shaft 19 between the stanchions 12 and 13, but may be positioned at any other suitable point of said shaft. A motor 24, of any desired construction, but preferably electric, is mounted within the inner shell 11 and has a pulley 25 mounted on its drive shaft 26. The belt 27 transmits power from the pulley 25 to the pulley 23 which in turn drives the propeller.

A bifurcated pipe 28 communicates with the flow medium inside the tank. Each of the bifurcations have a valve 29 and 30, respectively. One of said bifurcations leads to a vacuum pump and the other to a pressure pump. A combined pressure and vacuum gauge 31 is positioned on the pipe 28, for indicating the pressure or vacuum. All to the end that the pressure inside the tank may be controlled so that the model may be tested under practical or theoretical conditions.

A thermometer 32, of any suitable construction, is placed in the flow medium with its indicating means on the outside of the tank shell.

The operation of my invention is as follows: The propeller is started twirling by putting into action the motor. The temperature is then brought to a point well below the freezing point of the material used in constructing the model. The model is then mounted in position with any desired angle of incidence. The temperature is then allowed to rise to a point just at, or slightly below (or, in some cases slightly above) the freezing point of model, depending on the contour of the model, the material used for the model, velocity of the flow stream, pressure inside the tank, etc. When the desired temperature has been established, it is maintained for a period long enough to allow the heat produced by any eddy currents around the model to melt the model at the points creating such eddy currents. By starting a test run well below the freezing point of the model, the greatest obstructions to the ideal streamline contour can be reduced first, and then by increasing the temperature incrementally, the corresponding increments of streamline obstruction can be disposed. Both temperature and velocity of the flow medium, as well as pressure, may be varied independently or jointly to obtain data. After obtaining the desired streamlined contour, it may be preserved by various methods such as photographs, wax impressions, chemical or electro-chemical platings, etc.

With this invention it is possible to make continuous observations of the model as it undergoes change during a test run, and should it be desired to preserve such an observation, it may be accomplished by the use of motion pictures.

It is to be understood that various changes may be resorted to within the scope of the appended claims, without sacrificing any advantages of this invention or departing from the spirit thereof.

Having fully described this invention, I claim:

1. The method of determining streamlined contours, said method consisting of subjecting to the influence of a conditioned flow medium a model of material disposable by sublimation.

2. A method for determining streamlined contours, said method consisting of subjecting to the influence of a conditioned flow medium a model fabricated entirely of a material chosen from the group consisting of water-ice, snow, solid carbon dioxide, napthalene, and iodine.

3. The method of incrementally disposing obstructions to a streamlined structure, said method consisting of subjecting a model of material disposable by sublimation to incremental changes of a conditioned flow medium.

4. A wind testing tunnel consisting of an outer shell, an inner shell supported within said outer shell effecting a confined annular space between said shells, a prime mover disposed within said inner shell, tubular coils disposed within said annular space adapted to house a circulating field, means for mounting a model of a heat disposable material in said annular space, a fan mounted in said annular space between said coils and said model to create a flow stream in the direction of said model, and means for varying the pressure within said annular space.

5. A wind tunnel comprising an outer shell, an inner shell supported within said outer shell, effecting a confined annular space between said shells, means for producing a flow stream in said annular space, and means for conditioning said flow stream with respect to temperature velocity pressure.

6. A wind tunnel comprising an outer shell, an inner shell supported within said outer shell, effecting an annular space between said shells, and means for producing a flow stream in said annular space.

ALBERT J. KRAMER.

CERTIFICATE OF CORRECTION.

Patent No. 2,152,317.  March 28, 1939.

ALBERT J. KRAMER.

It is hereby certified that error appears in the printed specification of the above numbered patent requiring correction as follows: Page 2, second column, line 26, claim 4, for the word "field" read fluid; and that the said Letters Patent should be read with this correction therein that the same may conform to the record of the case in the Patent Office.

Signed and sealed this 16th day of May, A. D. 1939.

Henry Van Arsdale (Seal) Acting Commissioner of Patents.